United States Patent

Doll et al.

[11] 4,157,035
[45] Jun. 5, 1979

[54] INDUCTIVE FLOW METER

[76] Inventors: Friedhelm Doll, Hoffnug 16, 5632 Wermelskirchen; Jacob Rolff, Auf dem Postberg, 5158 Horrem, both of Fed. Rep. of Germany

[21] Appl. No.: 887,877

[22] Filed: Mar. 20, 1978

Related U.S. Application Data

[63] Continuation-in-part of Ser. No. 749,331, Dec. 10, 1976, abandoned.

[30] Foreign Application Priority Data

May 6, 1976 [DE] Fed. Rep. of Germany ....... 2619971
May 12, 1977 [DE] Fed. Rep. of Germany ....... 2721430

[51] Int. Cl.$^2$ ............................................. G01F 1/58
[52] U.S. Cl. ............................................. 73/194 EM
[58] Field of Search ................................... 73/194 EM

[56] References Cited

U.S. PATENT DOCUMENTS

| 3,550,446 | 12/1970 | Tucker et al. | 73/194 EM |
| 3,802,263 | 4/1974 | Krechmery et al. | 73/194 EM |
| 3,965,738 | 6/1976 | Watanabe | 73/194 EM |

FOREIGN PATENT DOCUMENTS 2410407  9/1975  Fed. Rep. of Germany ..... 73/194 EM

*Primary Examiner*—Charles A. Ruehl
*Attorney, Agent, or Firm*—Spensley, Horn, Jubas & Lubitz

[57] ABSTRACT

In this inductive flow meter a pair of electrodes are disposed on opposite sides of a tube through which flows the fluid being measured. A magnetic field is generated across the tube, the strength of which increases and decreases linearly with time. The voltage developed across the electrodes is scanned by first and second sample and hold circuits operative respectively near the beginning and near the end of each increasing or each decreasing branch of the magnetic field cycle. A difference circuit obtains the mean value of the difference between the sampled voltages; this value very accurately indicates the flow rate, since the described circuitry compensates for various system error voltages.

13 Claims, 6 Drawing Figures

4,157,035

INDUCTIVE FLOW METER

BACKGROUND OF THE INVENTION

1. Related Application

The present application is a continuation-in-part of the (Dec. 10, 1976) inventors' copending application, Ser. No. 749,331, now abandoned. 2. Field of the Invention The invention relates to an inductive flow meter comprising at least one solenoid generating an alternating magnetic field in the flow region and a pair of electrodes connected with an evaluation circuit.

3. Description of the Prior Art

Such flow meters operate under the Faraday induction law, according to which an electrical voltage is generated in response to movement of the charge carriers in a magnetic field. In practice, a solenoid provides a magnetic field which extends across a tube through which the liquid to be metered flows. Two electrodes are provided at diametrically opposite sides of the tube; the voltage to be evaluated is taken from these electrodes. This voltage $U_{net}$ is proportional to the magnetic flux density B, the flow rate v and the pipe diameter d, and this can be expressed by the following formula:

$$U_{net} \sim B \cdot v \cdot d$$

It is taken for granted that the vectors of the voltage $U_{net}$, of the flux density B and of the flow rate v are perpendicular relative to each other.

The practical implementation of such flow measurements is quite difficult in spite of the simple physical principle because the measuring voltage $U_{net}$ is distorted by a series of interference voltages. If the solenoid is operated with alternating current, the following types of interference voltages occur:

1. Inductive interference voltages which are caused by the inductive coupling of the magnetic coils with the electrode circuit.
2. Capacitive interference currents by the capacitances between the electrodes and the magnet system. These interferences are dictated, inter alia, by the conductivity between the electrodes (e.g., conductivity of the liquid, degree of contamination).
3. Polarization voltages caused by different potentials formed when the liquid contacts the tube walls or the electrodes.
4. Vagrant parasitic currents generated e.g., by the induction in the liquid. These parasitic currents, as a rule, have the frequency of the mains supply concerned of 50 Hz or 16⅔ Hz.

These voltages are superimposed on the active voltage $U_{net}$, so that to obtain high measurement accuracy of the wanted signal it is absolutely imperative to eliminate the different interference voltages.

In addition to the conventional flow meters operated at 50 Hz, there is another type of prior art inductive flow meter which uses a solenoid that generates a d.c. field timed (i.e., connected and disconnected periodically) at a low frequency. The time slope of the magnetic current approximately corresponds to a rectangular function. Each switch operation is accompanied by transient effects which must end before the measurement can be made. The measurement of the active voltage is, therefore, made on a short-time basis by a difference evaluation of the momentary values which are determined during the switch-on and switch-off times of the magnetic field. The interference d.c. voltage, which may be a thousand times the active voltage, is separated from the supply voltage so that the difference of two voltage levels of nearly equal height is formed. It is difficult to obtain an accurate evaluation with this approach.

The use of a timed d.c. field involves the advantage that the inductive and capacitive interference voltages are zero. When using a sine alternating field, it is very difficult to separate the inductive and capacitive interference voltages from the wanted signal. On the other hand, it has the advantage that by using an a.c. field, the polarization voltages are eliminated.

It is an object of the present invention to provide an inductive flow meter of the type described, which uses a very simple evaluation circuit wherein the wanted signal can be separated from all interference voltages so as to obtain relatively great accuracy. At the same time, d.c. voltage drifts caused by the requisite amplifiers or by the polarization voltages can be compensated for.

SUMMARY OF THE INVENTION

To achieve this objective, the present invention utilizes a specific evaluation circuit and a specific curve shape (e.g., triangular) and frequency of the magnetic current.

In the evaluation circuit, a first voltage sample and hold circuit is so controlled that in each period of the electrode voltage a value in the vicinity of the upper peak value is sampled and held in storage. A second voltage sample and hold circuit is so controlled that in each period of the electrode voltage a value in the vicinity of the lower peak value is sampled and held in storage. The output signals of both the voltage scanning memories are supplied to difference amplifier the output of which is connected to a measuring instrument via an average value former.

Due to the fact that the peak values in both the half periods are retained, stored and compared with each other, the exact value for the active voltage is obtained at the measuring instrument. The voltage at the output of the difference amplifier is constant as long as there is no drift. In case of a drift, a rectangular voltage does exist at the output of the difference amplifier and its arithmetical mean value is the real net voltage. Therefore, it is easily possible to determine the active voltage from the output voltage of the difference amplifier.

It is a prerequisite for the elimination of the inductive and capacitive interference voltages and of the vagrant parasitic currents that the solenoid be operated at a sufficiently low frequency. This should be lower than the frequencies of the industrial alternating voltages which are 50 Hz or 16⅔ Hz. Preferably, the frequency of magnetization should be at about 1 Hz. The magnetization is carried out by excitation of the solenoid with a constantly rising and constantly falling current, so that there is no need to wait for transient effects to terminate before taking the measurements.

To determine the sample points during the magnetization period, the inventive circuitry advantageously includes a multi-stage frequency divider, connected with the a.c. supply, together with a waveshape generator connected to the solenoid via an amplifier circuit having a high-impedance output, the outputs of individual stages of the frequency divider being combined in two AND-gates each of which controls one of the voltage scanning memories.

Thus, both synchronization of the sample points as well as excitation of the waveshape of the magnetic field are realized by dividing the power frequency. Since it is necessary that the magnetic field have a very low frequency, and since the power frequency (at 50 Hz) has a half wave duration of 10 msec, the power frequency offers a time increment sufficiently fine for establishing the scanning rate. The selection of scanning increments may be performed by a suitable combination of the outputs of the frequency divider, using logical switches responsive to specific frequency divider output signal combinations.

Preferably, the electrodes are connected via d.c. blocking capacitors to respective terminals of a common input amplifier. The blocking capacitors prevent d.c. voltages from reaching the evaluation circuit. Higher frequency interference voltages are blocked by a low-pass filter interconnected between the input amplifier and the voltage scanning memory, the limit frequency of this filter being below 16 Hz.

An extremely advantageous magnetic field curve is obtained by connecting the solenoid to a source of current that rises and falls linearly with time. Such a triangular current flow causes the inductive interference voltages and the capacitive interference currents always to be of rectangular waveform. The amplitudes of the interference factors are constant. By controlling the voltage scanning memories in such a way that the two sample points always lie on the same rising or falling branch of the ramp voltage, the constant interferencesum voltage is eliminated by obtaining the difference between the values at the two scanning points.

BRIEF DESCRIPTION OF THE DRAWINGS

A preferred working example of the invention is explained more fully hereinafter with reference to the drawings wherein.

DESCRIPTION OF THE PREFERRED EMBODIMENT

Figure 1:
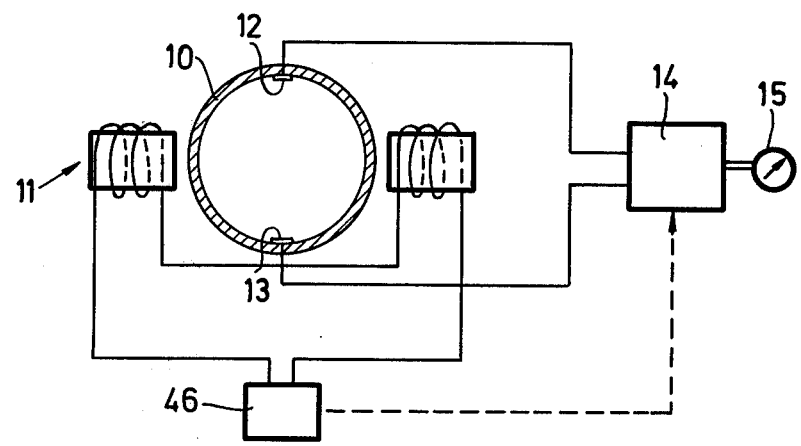
FIG. 1 shows the schematic design of an inductive flow meter which may be operated in accordance with the present invention.

As shown in FIG. 1, a measuring tube 10 of non-magnetic material is provided with a magnetic coil or solenoid 11 which generates a magnetic field passing through tube 10. Inside the tube there are provided two electrodes 12, 13 which are diametrically opposed. The imaginary line connecting the electrodes 12, 13 cuts perpendicularly across the magnetic field. Electrodes 12, 13 are connected to the input of an evaluation circuit 14. The measured voltage is read out at a meter or like instrument 15 connected to the evaluation circuit 14. To generate the magnetic field, the magnetic coil 11 is connected to the control circuit 46 which impresses on the magnet winding a current having a specific waveshape. In addition, the control circuit 46 establishes the sample points used by the evaluation circuit 14.

Figure 2:
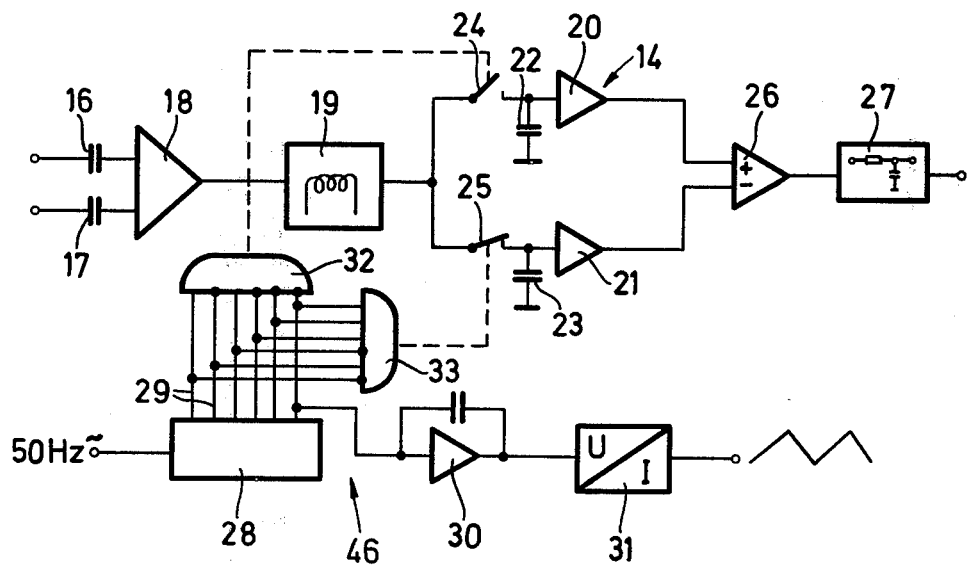
FIG. 2 shows an electrical block diagram of an evaluation circuit according to the invention.

FIG. 2 shows a block diagram of the evaluation circuit 14 and of the control circuit 46. The input lines of the evaluation circuit 14 coming from the electrodes 12, 13 are connected via blocking capacitors 16, 17 with an input terminal of an amplifier 18. The output of the amplifier 18 is connected, via a low-pass filter 19 having a cut-off frequency below 16Hz, to two voltage scanning memories each including an amplifier 20, 21. At the input to each such amplifier, there is provided a holding capacitor 22, 23. Control of the sample points is performed by one or the other of a pair of switches 24, 25 operated by the control circuit 46. Switches 24, 25 are indicated as mechanical switches to simplify the illustration. In a practical implementation of the circuitry, electronic switches would be used.

The output lines of the voltage sample and hold circuit amlifiers 20, 21 are connected to the inputs of a difference amplifier 26, the output of which feeds a mean value former 27. The output of the mean value former 27 is the output of the evaluation circuit 14, and is supplied to the indicator 15.

The control device 46 is operated in synchronism with the 50 Hz power frequency. To this effect, the input of a multistage frequency divider 28 is connected to receive a clock signal at the power frequency. A rectangular voltage having a frequency of 50/64 Hz=0.78 Hz is obtained at one output of the binary frequency divider 28. This rectangular voltage is supplied to an integrator 30 consisting of a capacitive-feedback-coupled amplifier. A triangular voltage is generated at the output of the amplifier 30 which is supplied to a driver amplifier 31 having a high output resistance and being capable of impressing on the coil or solenoid 11 a triangular current with a frequency of 0.78 Hz.

The control of switches 24 and 25 is performed via a pair of AND-gates 32 and 33. In FIG. 2, each of the inverting inputs of the gates 32 and 33 is indicated by a dot; the other inputs are non-inverting.

At the inputs of the gates 32 and 33, the outputs of the frequency divider 28 are so combined that the output signal of each gate 32, 33 exists only in a short time interval within each period of the triangular magnetization current.

The frequency divider 28 could be also considered a counter, and the outputs associated with different counts can be supplied to a digital-to-analog converter which would take the place of the integrator 30.

Figure 3:
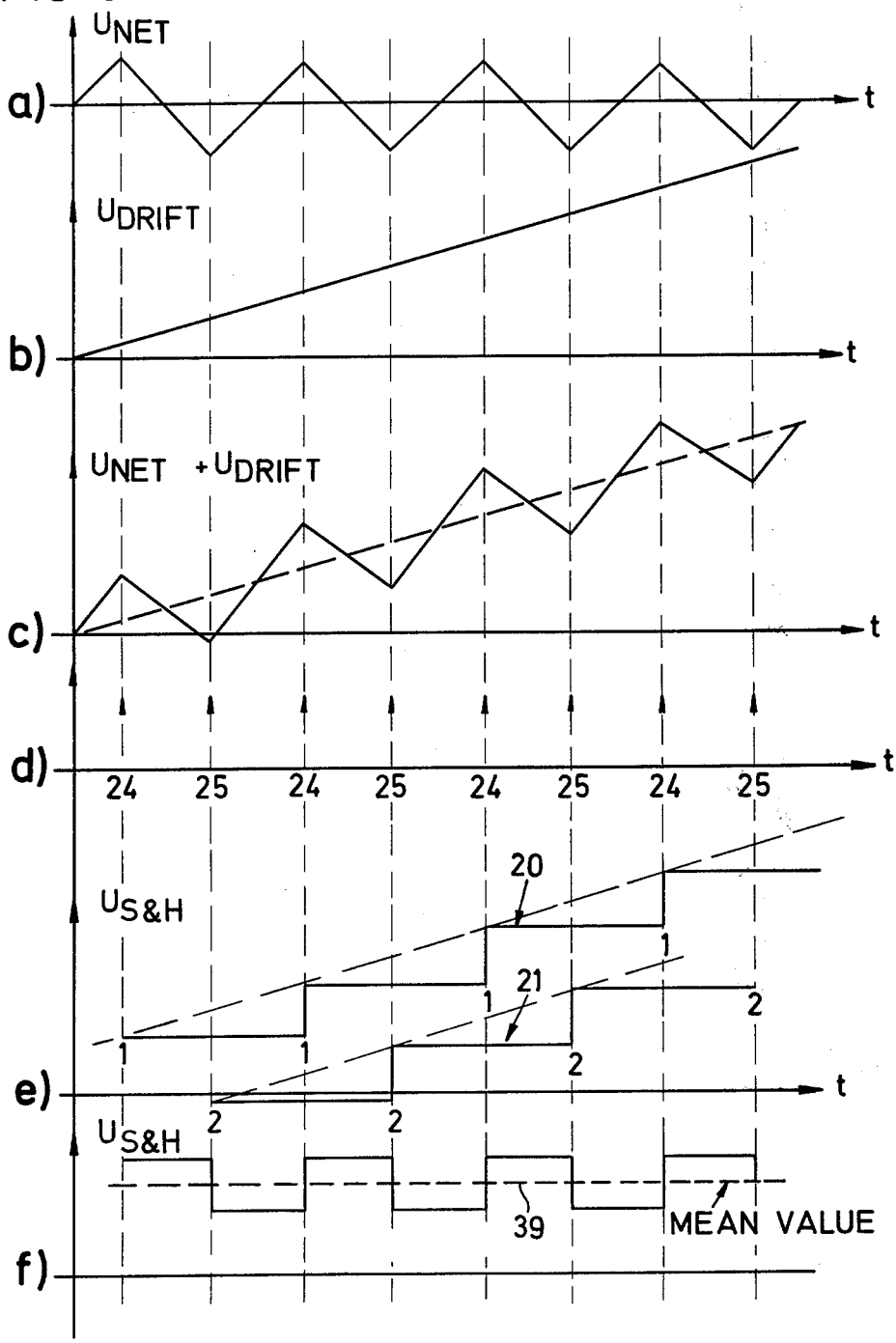
FIG. 3 shows different voltage curves illustrating the elimination of the voltage drift.

For a better understanding and with reference to FIG. 3, it is first supposed that switch 24 is always closed on a short-time basis by the gate 32 at the upper peak value of the triangle current, and that the switch 25 is closed by the gate 33 at the lower peak value of the triangular voltage. It must be taken into consideration that the temporal development of the active voltage $U_{net}$ generated at the electrodes 12 and 13 is equal to the time variation of the triangular current generated at the output of the amplifier 31. To explain how the interference influences are eliminated due to slow changes of the direct voltage potential, suppose for the moment that inductive and capacitive couplings do not occur or are negligible, and that stray parasitic currents from external sources are eliminated by the low-pass filter 19. The remaining interference influences are polarization voltages which change very slowly in time, and the drift of the input amplifier 18.

In FIG. 3, curve (a) shows the development of the active voltage signal $U_{net}$. This active voltage signal is superimposed on the interference voltage $U_{drift}$ shown in (b), composed of the polarization voltages and the amplifier drift, and changing very slowly in time. The combined signal, including both the interference voltage and the active voltage, which occurs at the output of the amplifier 18 is illustrated by curve (c) of FIG. 3. The sample points are shown in (d). These are the times at which the indicated switches 24 and 25 are closed briefly to feed into the voltage sample and hold circuits 20 or 21 the combined signal amplitude values. These values are retained until the next closure of the switch concerned. In FIG. 3 (e) the resultant voltage levels are shown for the two sample and hold circuits 20 and 21, if the input signal develops as shown in (c). It is apparent that stepped curves are formed at the outputs of the two voltage sample and hold circuits 20 and 21 which are offset with respect to each other as to amplitude and time.

In FIG. 3 (f) the temporal development of the output signal of the mean value former 27 is shown. The difference between the output voltages of the amplifier 20 and 21 varies about the mean value 39 in the form of a rectangular curve. This mean value is obtained in the arithmetic means value former 27 which is, for instance, an RC-element. The mean value 39 is proportional to the active voltage $U_{net}$. It is readily evident that the rectangular curve in FIG. 3 (f) disappears and becomes the constant voltage 39 if there is no time variable interference voltage such as shown in (b). In such a case, the difference between the upper and the lower peak value of the signal to be evaluated always is constant.

Figure 4:
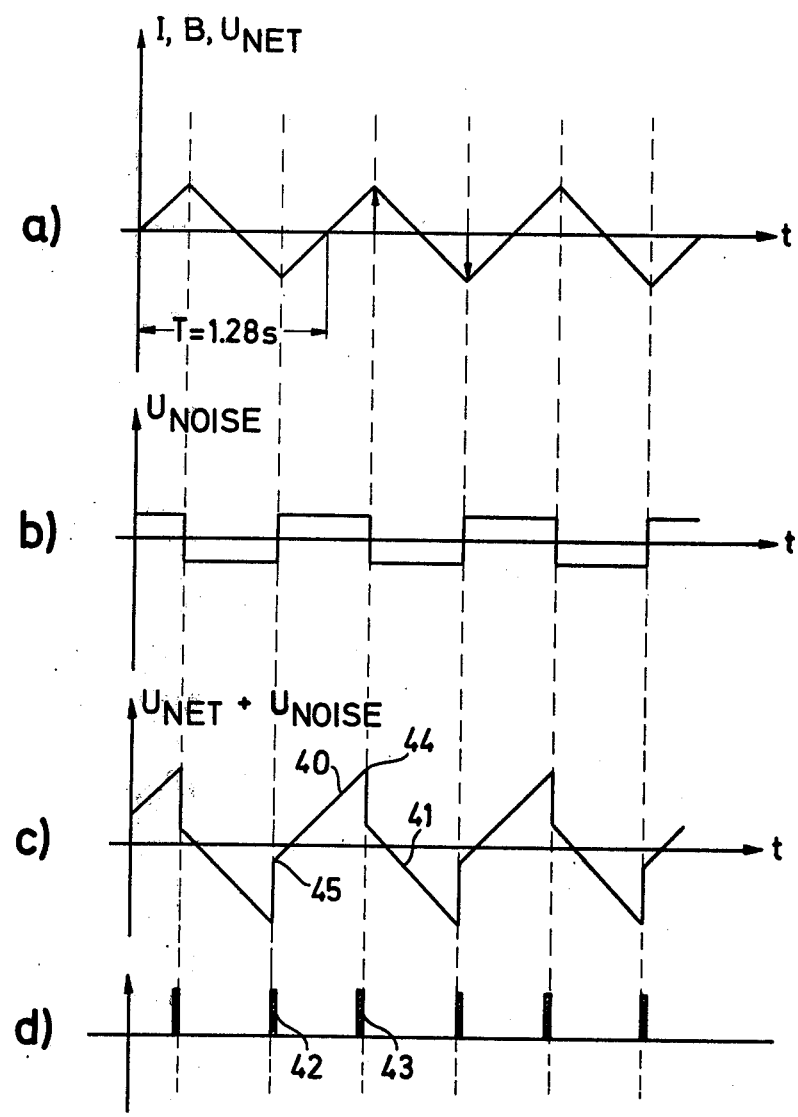
FIG. 4 shows different voltage diagrams to demonstrate the elimination of inductive and capacitive interference voltages.

Due to the temporal change of the interference direct voltage, the frequency of the magnet current cannot be substantially below about 1 Hz. Thus, it is still possible that inductive and capacitive interference voltages exist which will alter the measured result. In FIG. 4 (a), the temporal development of the magnetization current I is indicated as corresponding to the time variation of the flux density B and of the wanted signal $U_{net}$. The inductive interference voltage, as known, is:

$$U_{IN} = L \, di/dt$$

and, accordingly, it is proportional to the time derivative of the magnetization current. The magnetization current being a triangular function, the inductive interference voltage becomes a rectangular function. The same applies to the capacitive interference current $I_C$, fo which the formula $$I_C = C \cdot du/dt$$

is applicable. The two interference factors, which are of equal phase and rectangular, can be combined into the interference voltage $U_{noise}$ shown in FIG. 4 (b).

The combined active-interference signal is shown in FIG. 4 (c). This results from superimposing the triangular active voltage $U_{net}$ on the rectangular interference voltage $U_{noise}$. To extract only the active portion from the combination signal shown in FIG. 4 (c), sampling points 42, 43 shown in FIG. 4 (d) are situated so that the evaluation of the combined signal always occurs only on the rising branch 40 or only on the descending branch 41. In the instant case, the rising branch 40 has been chosen. The inputs of gates 32 and 33 (FIG. 2) are switched so that the output signals 42 of the gate 32 always occur 50 msec after the lower reversal point of the triangle voltage, and so that the output signals 43 of the gate 33 always occur 50 msec before the upper reversal point of the triangle voltage. This ensures that the scanning is performed only on the rising branch 40 of the total signal. It is evident that subsequently, when the difference between voltages 44 and 45 is obtained, the interference voltage drops out because at both sample times it is always of equal amplitude.

The use of a triangular magnetization current is advantageous because the inductive and capacitive interference influences are rectangular and can be eliminated by a suitable selection of the scanning sample points. Moreover, the triangle voltage ensures that transient effects are avoided during the remagnetization. The triangle shape of the magnetization current can be implemented easily, and it can be derived from the power frequency, it being possible to perform the time control of switches 24 and 25 with the same control circuit 46.

Figure 5:
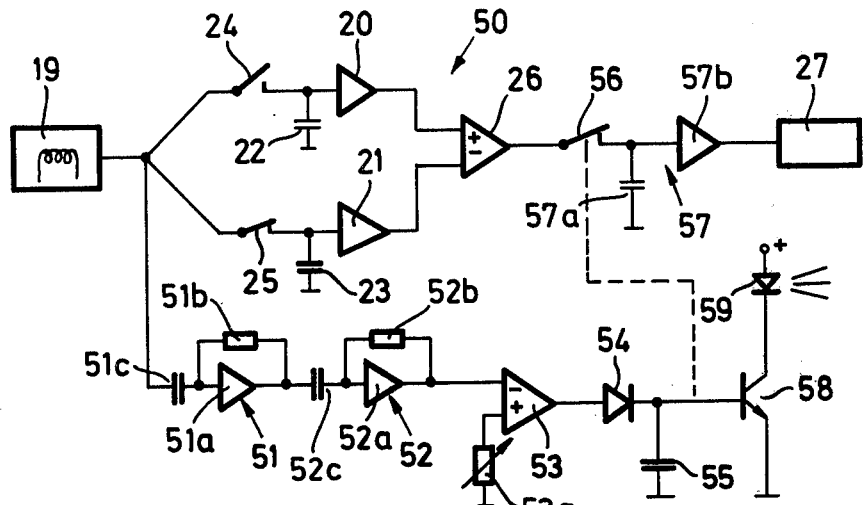
FIGS. 5 and 6 show electrical block diagrams of alternative, optional circuitry for interference suppression.

FIG. 5 shows a first embodiment 50 of an interference suppression circuit that compensates for interference signals which do not linearly increase or decrease in time. The measurement signal from the electrodes 12, 13 is supplied via the low-pass filter 19 to a first differentiator circuit 51, and thereafter to a second differentiator circuit 52. The differentiators 51, 52 each consist, in a manner known per se, of an operational amplifier 51a, 52a having a feedback resistor 51b, 52b and an input capacitor 51c, 52c.

The output of each differentiator circuit 51, 52 is the time derivative of the input signal to that circuit. Thus, the output of the second differentiator circuit 52 corresponds to the second derivative of the electrode measurement signal supplied from the filter 19. If no interference voltages exist, so that the measurement signal increases or decreases linearly, the first derivative signal at the output of the circuit 51 will be constant, and the second derivative signal at the output of the circuit 52 will be zero. (Brief transients will occur at the output of the circuit 52 in correspondence with the knees or turning points of the triangular or trapezoidal measurement signal.)

If a non-linear interference voltage is superimposed on the measurement voltage, the second derivative of the combined signal will not be zero. In such case, the circuit 52 will produce an output signal indicative of the presence of such a non-linear interference voltage. This signal is supplied to one input of a differential amplifier 53 which receives at its other input a reference voltage set by a potentiometer 53a. This reference voltage establishes a threshold value which must be exceeded by the second derivative signal from the circuit 52 before the amplifier 53 will produce an output. The output of the differential amplifier 53 is supplied via a diode 54 having an output filter capacitor 55 to the control element of a switch 56 that is connected in the output line from the difference amplifier 26. For simplicity of illustration, the switch 56 is shown as a mechanical switch. In practice, an electronic switch such as a field effect transistor would be used. Connected between the switch 56 and the mean value former 27 is a voltage sample and hold memory 57 consisting of a holding capacitor 57a and an amplifier 57b.

If the output of second differentiator circuit 52 surpasses the set threshold value, the switch 56 will be opened so as to interrupt signal flow from the amplifier 26 to the mean value former 27. The last signal amplitude present just before opening of the switch 56 will be stored in the voltage sample and hold memory 57 so that the indicating instrument 15 connected to the mean value former 27 will not change its indication during the time of interruption of the switch 56. When the amplitude of the interference signal decreases below a certain value, the differential amplifier 53 will no longer produce an output signal. The switch 56 then will close, after a slight delay for discharge of the capacitor 55. The difference amplifier 26 then will again be connected to provide an input to the mean value former 27.

A light-emitting diode 59 provides a visual indication that an interference voltage is present. To this end, the output from the differential amplifier 53 and diode 54 also is supplied to a transistor 58 which then turns on current to the diode 59.

The transients which occur at the output of the second differentiator circuit 52 in correspondence with the knees of the triangular or trapezoidal measurement signal may exceed the threshold established at the differential amplifier 53. These transients will be filtered by the capacitor 55. However, even if they should cause opening of the switch 56, it will be for only a short time duration, and this will not effect the measurement indicated by the indicating instrument 15 since the last prior measurement signal will still be provided to the mean value former 27 by the sample and hold memory 57.

Figure 6:
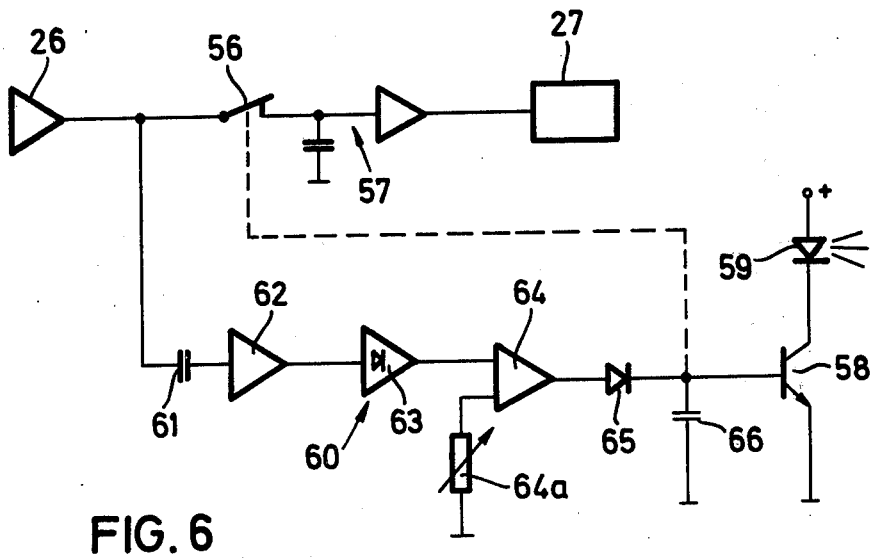

An alternative embodiment of an interference suppression circuit is shown in FIG. 6. This circuit 60 makes use of the fact that the output of the difference amplifier 26 (shown in FIG. 3 (f)) contains an alternating voltage component only if an interference signal is present. The amplifier 26 output is a constant or direct voltage if no interference signal is present. In the case of a slowly varying interference signal (drift), the output of the difference amplifier 26 contains a rectangular voltage superimposed on the effective dc signal. If interference voltages of higher frequency are present, they will cause the superposition of a corresponding higher frequency component on the output of the difference amplifier 26.

In the embodiment of FIG. 6, the alternating voltage component, present at the output of the difference amplifier 26 and indicative of an interference signal, is a.c. coupled via a capacitor 61 to an amplifier 62. The output of the amplifier 62 is rectified by a rectifier 63, the output of which is fed to one input of a difference amplifier 64. A reference voltage is supplied via a potentiometer 64a to the other input of the amplifier 64, so that the potentiometer 64a functions to establish a threshold value.

Similar to the example of FIG. 5, a diode 65 and a filter capacitor 66 are connected between the output of the difference amplifier 64 and the control element of the switch 56. Occurrence of an interference signal of sufficient magnitude to overcome the threshold set by the potentiometer 64a likewise causes the switch 56 to open. The last prior signal level from the difference amplifier 26 continues to be supplied to the mean value former 27 via the sample and hold memory 57 so that the indicated signal level is unchanged. Again, a light-emitting diode 59 gives a visual indication of the presence of the interference voltage.

The interference suppression circuit of FIG. 6 has the advantage that both slow drifts as well as high frequency interferences may be recognized and eliminated. The circuit 60 will handle voltages up to the threshold level set for the amplifier 64. The circuits 50 and 60 both have the benefit that the evaluation system will not supply incorrect values in the presence of interference.

What is claimed is:

1. An inductive flow meter comprising a current source and at least one solenoid generating in the flow region an alternating magnetic field and a pair of electrodes connected to an evaluation circuit, characterized in that the current source provides to the solenoid a current linearly rising and falling in time, so that the generated magnetic field and the resultant electrode voltage both alternately increase and decrease linearly in time, that the evaluation circuit has a first voltage sample and hold circuit controlled to sample and store, during each period of the electrode voltage, a value in the vicinity of the upper peak value and a second voltage sample and hold circuit to sample and store during each period of the electrode voltage, a value in the vicinity of the lower peak value, and that the evaluation circuit has a difference amplifier and a mean value former, the output signals of both voltage sample and hold circuits being supplied to said difference amplifier the output of which is connected to said mean value former, the output of said mean value former being connectable to a measuring instrument.

2. An inductive flow meter according to claim 1, characterized in that said current source comprises a frequency divider, connectable to an a.c. power source, a waveshape generator to which said frequency divider is connected, an amplifier circuit having a high-impedance output connected between said waveshape generator and said solenoid, two AND-gates, the outputs of the frequency divider being combined in said two AND-gates each of which controls one of said voltage sample and hold circuits.

3. An inductive flow meter according to claim 1 and having a common input amplifier, characterized in that the electrodes are connected via one blocking capacitor each with a respective one terminal of said common input amplifier, the output of said common input amplifier being supplied to said first and second voltage sample and hold circuits.

4. An inductive flow meter according to claim 3 and having a low pass filter, characterized in that said low pass filter is connected between the output of the input amplifier and the sample and hold circuits, said low-pass filter having a cut-off frequency which is below 16 Hz.

5. An inductive flow meter according to claim 1 characterized in that said current source is an integrator that converts a rectangular voltage into a ramp voltage having alternately positive and negative gradients.

6. An inductive flow meter according to claim 1 characterized in that the voltage sample and hold circuits are controlled so that the two sample points always lie on the same rising or falling branch of the solenoid current.

7. An inductive flow meter according to claim 1 wherein the electrode voltage is fed to an interference suppression circuit comprising:
   first and second differentiator circuits connected in series, said second differentiator circuit producing an output if the second derivative of the electrode voltage exceeds a certain level, and
   circuit means, responsive to the output of said second differentiator circuit, for disconnecting the output of said difference amplifier from said mean value former when said output of said second differentiator circuit exceeds said certain level.

8. An inductive flow meter according to claim 1 wherein the output of said difference amplifier is fed to an interference suppression circuit comprising:

an a.c. coupled amplifier receiving said output from said difference amplifier, a rectifier for rectifying the output of said a.c. coupled amplifier so as to provide an inhibit signal if the alternating portion of said difference amplifier output exceeds a certain value, and switch means for disconnecting the output of said difference amplifier from said mean value former in response to occurrence of said inhibit signal.

9. An inductive flow meter of the type wherein a magnetic field is generated across a non-magnetic tube in which there is flowing the fluid to be measured, and having a pair of diametrically opposed electrodes situated on said tube along a line that crosses said magnetic field, the improvement comprising:

solenoid drive means for producing a magnetic field across said tube that alternately increases and decreases linearly with time, first means for sampling and holding the voltage sensed across said electrodes near the start of each increasing or each decreasing time portion of said magnetic field, second means for sampling and holding the voltage sensed across said electrodes near the end of each same increasing or decreasing time portion of said magnetic field, and voltage difference means for obtaining the mean value of the difference between the voltages sampled by said first and second sampling and holding means.

10. An inductive flow meter according to claim 9 wherein said solenoid drive means includes a solenoid situated to produce a magnetic field across said tube perpendicular to the line through said opposed electrodes, triangular wave circuitry for generating a triangular wave current at a frequency substantially below that of the a.c. power supply mains, and connected to supply said triangular wave current to said solenoid, and gate circuitry, connected to said triangular wave circuitry, for producing first and second control signals respectively near the beginning and near the end of the same alternate half cycles of said triangular wave current, said first and second control signals being connected respectively to enable said first and second sampling and holding means.

11. An inductive flow meter according to claim 10 further comprising:

an amplifier, said electrodes being connected via d.c. blocking capacitors to an input of said amplifier, and a low-pass filter connecting the output of said amplifier to the inputs of both said first and second sampling and holding means.

12. An inductive flow meter according to claim 9 wherein the voltage sensed across said electrodes is fed to an interference suppression circuit comprising:

first and second differentiator circuits connected in series, said second differentiator circuit producing an output if the second derivative of the sensed voltage exceeds a threshold level, and circuit means, responsive to the output of said second differentiator circuit, for disconnecting said sampled voltages from said means for obtaining the mean value when said output exceeds said threshold level.

13. An inductive flow meter according to claim 9 wherein said voltage difference means comprises a difference amplifier receiving said sampled voltages, and a mean value former receiving the output of said difference amplifier, and wherein the output of said difference amplifier is fed to an interference suppression circuit comprising;

an a.c. coupled amplifier receiving said output from said difference amplifier, a rectifier for rectifying the output of said a.c. coupled amplifier so as to provide an inhibit signal if the alternating portion of said difference amplifier output exceeds a certain value, and switch means for disconnecting the output of said difference amplifier from said mean value former in response to occurrence of said inhibit signal.

* * * * *

UNITED STATES PATENT AND TRADEMARK OFFICE
CERTIFICATE OF CORRECTION

PATENT NO. : 4,157,035
DATED : June 5, 1979
INVENTOR(S) : Friedhelm Doll and Jacob Rolff It is certified that error appears in the above-identified patent and that said Letters Patent are hereby corrected as shown below:

ASSIGNEE: TURBO-WERK FRITZ HAMMELRATH, Koln, West Germany

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*